2,898,082

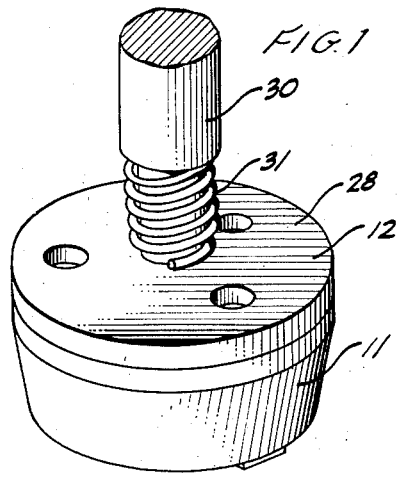
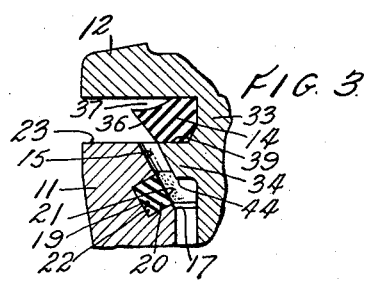
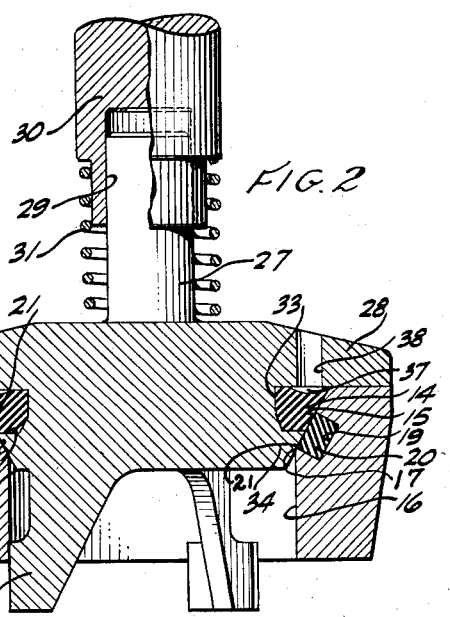
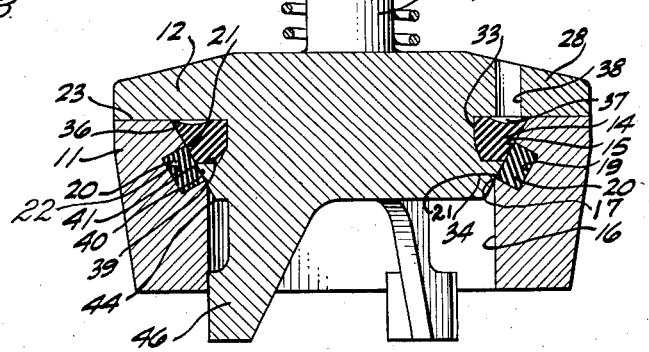
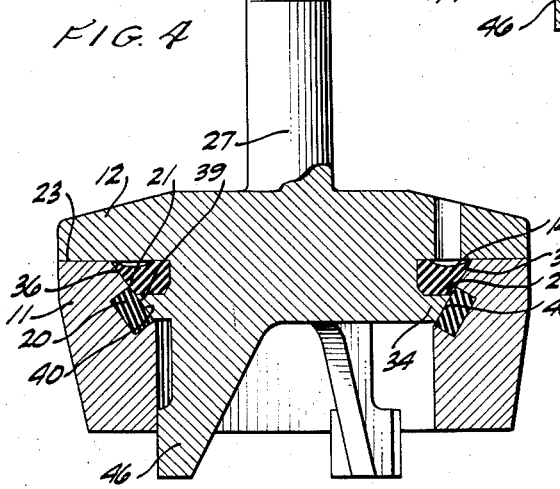
INVENTORS.
RUSSELL S. VON ALMEN,
CLARENCE H. LEATHERS,
BY William R. Spendly
ATTORNEY United States Patent Office 2,898,082
Patented Aug. 4, 1959

HIGH PRESSURE PUMP VALVE

Russell S. Von Almen, San Gabriel, and Clarence H. Leathers, Redondo Beach, Calif., assignors to Mac-Clatchie Manufacturing Company, Compton, Calif., a corporation of California Application August 9, 1956, Serial No. 603,100

4 Claims. (Cl. 251—333)

This invention relates to improved valve structures and more particularly to valve structures adapted in certain respects for use as fluid inlet and outlet check valves in high pressure pumps, as for instance in oil well mud pumps.

In drilling oil wells, a fluid mixture, commonly known as drilling fluid or "mud," is circulated in the well during the drilling operation by means of high pressure mud pumps. The mud is pumped downward through the hollow drill stem, and passes upwardly in the well around the drill stem carrying cuttings removed at the bottom of the hole. As the drilling of wells has become progressively deeper the load on the circulating mud pump has become increasingly great and the pressure required to obtain adequate circulation of the mud has become extremely high. As a result the inlet and outlet check valves on the circulating pump are opened and closed rapidly and with very great force.

Various valve structures utilized as inlet and outlet check valves for mud pumps in the prior state of the art are quickly damaged by the high pressure rapid operation and are soon rendered ineffective to close off fluid flow. In a well known type of mud pump check valve a metal valve body moves into and out of a valve seat having a tapered annular seating surface. The valve body carries a resilient annular sealing ring having an annular tapered face engageable with the seating surface. Various means for stopping the valve body in its downward travel are utilized. However, in the valve structures heretofore known to the art considerable difficulty has been encountered where a space exists beneath the resilient sealing ring and the annular sealing surface, due to the high pressure existing upon the resilient sealing ring which causes the ring to be extruded through any spaces existing between the rigid valve body and valve seat when the valve is in the closed or nearly closed position. Thus, where the resilient sealing ring is carried on a flange on the valve body and the flange moves into and out of the throat of the valve seat the resilient ring is extruded into the clearance between the flange and the seat. Extrusion and pinching of the sealing ring between the valve seat and valve body quickly causes sufficient wear of the sealing ring to destroy the sealing effect of the valve.

Accordingly, it is an object of the present invention to provide a valve structure in which the resilient sealing ring is not locally stressed or extruded between the valve seat and valve body.

It is another object of the present invention to provide a mud pump valve structure in which no spaces exist beneath the resilient sealing ring when the valve is in the closed position or as the valve moves toward the closed position.

It is a further object of the present invention to prevent pinching or wearing away of the valve sealing ring by providing support for the ring at the junction of the valve and seat.

It is a still further object of the present invention to provide a mud pump valve structure which will support the resilient sealing ring of the valve regardless of wear upon the stop means of the valve.

The present invention is a valve structure which includes an annular tapered valve seat with a resilient seating ring forming a part of the valve seating surface. A valve body which is movable into and out of the valve seat carries a resilient sealing ring which is supported on its lower surface by a supporting member carried on the valve body. The outer surface of the supporting member and the resilient seating surface of the resilient seating ring are so positioned that in the closed position of the valve the upper edge of the supporting member is in contact with the resilient seating surface to furnish complete support for the lower edge of the sealing ring in the closed and partially closed position of the valve.

The novel features which are believed to be characteristic of the invention, both as to its organization and method of operation, together with further objects and advantages thereof will be better understood from the following description considered in connection with the accompanying drawing, in which a presently preferred embodiment of the invention is illustrated by way of example. It is to be expressly understood, however, that the drawing is for the purpose of illustration and description only and is not intended as a definition of the limits of the invention.

Fig. 1 is a perspective view of a presently preferred embodiment of a valve utilizing the present invention;

Fig. 2 is a sectional view of the valve of Fig. 1;

Fig. 3 is a partial view in cross-section showing the valve body and seat of Figure 1 in the open position of the valve;

Fig. 4 is a sectional view like Fig. 2 of an alternative embodiment of the present invention; and Fig. 5 is a partial view in cross-section showing the valve body and seat of Figure 4 in the open position of the valve.

Referring to the figures and particularly to Figs. 1 and 2 the valve structure in its presently preferred embodiment includes a valve seat 11 and valve body 12 with a resilient sealing ring 14 carried upon the valve body. The valve seat 11 is annular and typically formed of a short length of metal tubing. At its inner surface, valve seat 11 has an annular inclined upwardly facing seating surface 15 and an inner wall 16 which is substantially vertical. The junction of the inner wall 16 and seating surface 15 defines the throat 17 of the valve. In accordance with the present invention an annular groove 19 is provided in the seating surface 15 proximate the throat of the valve and a resilient seating ring 20 is positioned in the groove. The resilient seating ring 20 is formed of elastomeric or similar material and is toroidal in configuration with the inner wall 21 of the seating ring 20 being tapered at substantially the same angle of taper as the seating surface 15. The seating ring 20 is dimensionally mateable with the groove 19 and is so formed that it may be easily inserted into the groove. That is, in this embodiment the side walls of the groove are substantially perpendicular to the seating surface 15 and the bottom wall 22 is substantially equal to but greater in diameter than the diameter of the outer wall of the seating ring 20 in its relaxed position. The dimensions and configuration of the groove and mating sidewalls and outer wall of the seating ring are not critical and optimum dimensions may be readily determined by one skilled in the art in view of the following description. The inner wall 21 of the seating ring preferably has a mean radius slightly less than the radius of the seating surface such that when positioned in the groove the inner wall 21 of the seating ring protrudes slightly from the metallic seating surface 15. The tapered resilient seating surface 21 thus extends from a position proximate the throat 17 of the valve upward for a distance along the tapered seating surface 15 as will be further described hereinafter. At its upper end the seat 11 has an annular surface 23 or shoulder, which is preferably transverse to the valve axis and acts as a stopping means for the downward travel of the valve body.

The valve body 12 is vertically movable with respect to the valve seat 11 and includes a vertically extending stem 27 which carries a transverse stop flange 28. The upper end of stem 27 may be guided for the desired vertical movement by reception within a bore 29 in a guide member 30, with the valve body being yieldingly urged downward to closed position by a spring 31.

The valve body 12 includes a substantially cylindrical body section 33 extending downwardly beneath the stop flange 28 and terminating an integral valve flange 34. Thus, an annular space is defined between the upper surface of the valve flange 34 and the lower surface of the stop flange 28. The resilient sealing ring 14 is carried by the valve body in the annular space and supported by the flange 34. The sealing ring 14 is of the type well-known to the art, being a deformable element of elastomeric material with a sealing face 36 which is mateable with the tapered seating surface 15 to seal the valve in the closed position. The inclined sealing face 36 is preferably disposed at a slightly greater angle to the valve axis than is the seating surface 15, to assure the formation of the most effective fluid seal between the valve body and seat. The sealing ring may be backed at its upper side against the central portion of the stop flange 28 while the outer portion is axially spaced from the flange 28 to provide an annular space 37 into which fluid may flow through circularly spaced openings 38 in the flange 28 to urge the sealing ring 14 downwardly against the seating surface 15 and seating ring 20. The force of the fluid acts in the closed condition of the valve to urge the sealing element 14 tightly against the seat 11.

The valve flange 34 is a rigid retaining member extending radially of the valve body to provide a support surface 39 for the sealing ring and a closing surface 40 which also prevents fluid flow through the valve in the closed position. The closing surface 40 is tapered at an angle substantially parallel to the seat surface 15 and seating ring surface and is axially positioned with respect to the valve seat such that the upper edge 41 of the closing surface 40 is located between the axial position of the upper and lower edge of the seating ring when the valve is in the closed position. The lower edge 44 of the closing surface 40 extends beyond the lower edge of the seating ring surface and may extend beyond the throat 17 of the valve as shown in this embodiment. The radial position of the closing surface 34 is determined with relation to the seating surface 15 and seating ring surface 21, such that in the closed position of the valve the closing surface is spaced at a predetermined distance radially from the seating surface 15 by an amount determined by the protrusion of the seating ring 20 from the seating surface 15. That is, as discussed herein before, the resilient seating surface 21 preferably protrudes slightly above the seating surface 15 and the closing surface 34 is spaced from the seating surface 15 by an amount which is less than the amount of protrusion of the resilient seating surface 21. Thus, in the closed position of the valve the lower surface of the stop flange 28 is at rest on the stop shoulder 23 of the seat 11 to limit the downward travel of the valve body. At this position the upper portion of the closing surface 40 of the valve flange 34 is in contact with the lower portion of the resilient seating surface 21 and is urging it inwardly, while the lower portion of the closing surface 40 is spaced from the seating surface 15. There is, therefore, metal to metal contact only between the stop shoulder 23 and flange 28.

The optimum amount of protrusion of the resilient seating ring 20 from the seating surface 15 and the radial spacing of the closing surface 40 from the metal seating surface 15 for various conditions may be determined by one skilled in the art in view of the foregoing discussion.

Thus, in the closed position of the valve the resilient sealing ring is in contact with the valve seat to form a fluid seal with the lower portion of the sealing face 36 in pressure contact with the seating surface 21 of the resilient seating ring 20. The lower edge of the sealing ring 14 is supported at all points by the seating surface 21 or the flange 34. No space exists through which the sealing ring can extrude or be pinched away.

The valve body 12 preferably carries a number of circularly spaced outwardly projecting guide fins 46, slidably engageable with the inner wall 16 of the seat 11 to cooperate with the guide member 30 in guiding the valve in its opening and closing vertical movement.

Various methods and means for guiding and stopping the valve body may be used in valve structures utilizing the present invention since those shown and described hereinbefore are illustrative only. For example, guide and stop means utilizing a spider mounted in the base of the seat may be used with the bottom surface of the valve flange 34 contacting the spider as a means for limiting the downward travel of the body.

In operation, the valve shown in Figs. 1 to 3 is normally urged by the spring 31 to its closed position of Fig. 2, in which the sealing surface 36 forms a fluid tight seal against the seating surface 15 and the resilient seating surface 21. The downward closing movement of the valve body 12 is limited by engagement of the stop shoulder 23 and stop flange 28. When the fluid pressure beneath the valve body 12 reaches a predetermined value, the valve body moves upwardly, to pass fluid upwardly past the seat surface 15 and flange 28. When the pressure at the underside of the valve subsequently decreases, the spring 31 and the fluid pressure at the upper side of the valve again return the valve body 12 downwardly to the closed and sealed position. It should be noted that in closing, the closing surface 40 of the valve flange 34 contacts the resilient seating surface 21 before the sealing surface 36 comes into contact to provide support for the lower edge of the sealing ring during the closing movement of the valve.

In Figs. 4 and 5 an alternative embodiment of the present invention is shown in which the axial relationship of the resilient seating surface 21 and the closing surface 40 of the valve flange 34 differs from that of the valve of Figs. 1 to 3. In other respects the embodiments are similar. In the valve of Fig. 4, the valve flange 34 is axially positioned such that the entire area of the closing surface 40 is in contact with the resilient seating surface. The lower edge 51 of the valve flange 34 is thus axially above the lower edge of the resilient seating surface 21 in the closed position of the valve while the upper edge of the resilient seating surface is axially above the upper edge 41 of the flange 34. If the resilient seating surface 21 is flush with the seating surface 15 the similarly tapered closing surface will have a mean radius slightly greater than the radius of the seating surface 15 at the corresponding axial location when the valve is in the closed position. Thus, the closing surface extends slightly into the groove 19 which is filled by the resilient seating ring 20, in order to provide pressure contact between the surfaces and furnish proper support for the lower edge of the resilient sealing ring. The length of the resilient sealing surface 21 along the sealing surface 15 is preferably greater than that in the valve of Figs. 1 to 3 and it may be seen that the length must be sufficient to allow clearance between the upper edge of the groove 19 and the upper edge of the flange 34 as the valve moves vertically to and from the closed position.

The operation of the valve of Figs. 4 and 5 is similar to that described in connection with the presently preferred embodiment of Figs. 1 to 3 with the closing surface 40 of the flange 34 coming into pressure contact with the resilient seating surface 21 over the entire surface 40 before contact of the sealing surface 36 of the sealing ring 14 to again furnish support for the lower edge of the sealing ring at the closed and partially closed position of the valve.

Thus, what has been described is an improved valve structure especially adaptable for mud pump check valves in which the resilient sealing ring is completely supported in the closed position of the valve. The present invention prevents extrusion or pinching away of the resilient sealing element of the valve regardless of the wear upon the stop means of the valve and provides a valve structure having increased life and greater efficiency than the valves heretofore known to the art.

It is to be understood that the foregoing description relates to only presently preferred embodiments of the invention and that numerous modifications or alterations may be made therein without departing from the spirit and scope of the invention as set forth in the appended claims.

We claim:

1. A valve structure comprising: a valve seat section, said seat section defining an annular tapered upwardly facing seating surface, a valve body section relatively movable into and out of said seat section, a deformable sealing element carried by said body section, said sealing element having an annular tapered downwardly facing sealing surface mateable with said seating surface, a supporting member carried on said valve body supporting the lower surface of said deformable sealing element, a deformable seating element positioned in said seat section, an inner wall of said deformable seating element forming a part of said seating surface, said deformable seating surface being axially positioned relative to said body section such that the upper edge of said supporting member and the lower edge formed by the intersection of the lower surface and the downwardly facing sealing surface of said sealing member, are in contact with said inner wall in the closed position of said valve, whereby the lower edge of said deformable sealing element is supported by said deformable seating element.

2. A valve structure comprising: a valve seat section, said seat section defining an annular tapered upwardly facing seating surface and a valve throat at the lower edge thereof, a valve body section relatively movable into and out of said seat section; a deformable sealing element carried by said body section, said sealing element having an annular tapered downwardly facing sealing surface mateable with said seating surface, said sealing element having a lower edge formed by the intersection of said downwardly facing sealing surface and the lower surface of said sealing element; a supporting member carried on said valve body supporting said lower surface of said deformable sealing element, said member extending radially outward, said member having a radially outer surface positioned parallel to said seating surface and spaced therefrom proximate the throat of said seat section when said valve is in the closed position; a deformable seating element positioned in said seat section, an inner wall of said deformable seating element forming a part of said seating surface, said deformable seating surface being axially positioned relative to said body section such that the upper edge of said supporting member and a portion of said sealing surface are in contact with said inner wall in the closed position of said valve, whereby the lower edge of said deformable sealing element is supported by said deformable seating element.

3. A valve structure comprising: a valve seat section, said seat section defining an annular tapered upwardly facing seating surface and a valve throat at the lower edge thereof, a valve body section relatively movable into and out of said seat section, means for stopping the downward travel of said valve body section, a deformable sealing element carried by said body section, said sealing element having an annular tapered downwardly facing sealing surface mateable with said seating surface, said sealing element having a lower edge formed by the intersection of said downwardly facing sealing surface and the lower surface of said sealing element; a supporting flange carried on said valve body supporting said lower surface of said sealing element, said supporting flange having a radially outer surface proximate the throat of said valve seat in the closed position, said outer surface being substantially parallel to and proximate said seating surface; a deformable annular seating element positioned in said seat section, the inner wall of said deformable seating element forming a part of said seating surface, said deformable seating surface being axially positioned proximate said throat and extending upward along said seating surface such that a portion of said outer surface of said flange and the coextensive portion of said sealing element are in contact with said inner wall in the closed position of said valve, whereby the lower edge of said deformable sealing element is supported by said deformable seating element.

4. A valve structure comprising: a valve seat section, said seat section defining an annular tapered upwardly facing seating surface and a valve throat at the lower edge thereof, said seat section defining a transverse shoulder, a valve body section relatively movable into and out of said seat section, a stop flange on said body section engageable with said shoulder for stopping the downward travel of said valve body section, an elastomeric sealing element carried by said body section, said sealing element having an annular tapered downwardly facing sealing surface mateable with said seating surface, said sealing element having a lower edge formed by the intersection of said downwardly facing sealing surface and the lower surface of said sealing element; a supporting flange carried on said valve body supporting said lower surface of said sealing element, said supporting flange having a radially outer surface proximate said throat of said valve seat in the closed position, said outer surface being substantially parallel to and proximate said seating surface; an annular elastomeric seating element positioned in said seat section, the inner wall of said elastomeric seating element forming a part of said seating surface, said elastomeric seating surface being axially positioned proximate said throat and extending upward along said seating surface such that said outer surface of said flange and the coextensive portion of said sealing element are in contact with said elastomeric seating surface in the closed position of said valve, whereby the lower edge of said elastomeric sealing element is supported by said deformable seating element.

References Cited in the file of this patent

UNITED STATES PATENTS

| | | |
|---|---|---|
| 1,705,800 | Akeyson | Mar. 19, 1929 |
| 2,060,748 | Roberts et al. | Nov. 10, 1936 |
| 2,163,472 | Shimer | June 20, 1939 |
| 2,372,629 | Nelson | Mar. 27, 1955 |
| 2,745,631 | Shellman | May 15, 1956 |